US011295704B2

(12) United States Patent
Tokuda

(10) Patent No.: US 11,295,704 B2
(45) Date of Patent: Apr. 5, 2022

(54) DISPLAY CONTROL DEVICE, DISPLAY CONTROL METHOD, AND STORAGE MEDIUM CAPABLE OF PERFORMING APPROPRIATE LUMINANCE ADJUSTMENT IN CASE WHERE ABNORMALITY OF ILLUMINANCE SENSOR IS DETECTED

(71) Applicant: HONDA MOTOR CO., LTD., Tokyo (JP)

(72) Inventor: Ryohei Tokuda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/984,194

(22) Filed: Aug. 4, 2020

(65) Prior Publication Data
US 2021/0043163 A1 Feb. 11, 2021

(30) Foreign Application Priority Data
Aug. 9, 2019 (JP) .............................. JP2019-147938

(51) Int. Cl.
*G06F 3/038* (2013.01)
*G09G 5/10* (2006.01)
(Continued)

(52) U.S. Cl.
CPC .............. *G09G 5/10* (2013.01); *B60K 35/00* (2013.01); *G01J 1/0228* (2013.01); *G01J 1/58* (2013.01);
(Continued)

(58) Field of Classification Search
CPC ......... G09G 5/10; B60K 35/00; G01J 1/0228; G01J 1/58
(Continued)

(56) References Cited

U.S. PATENT DOCUMENTS

2002/0154379 A1* 10/2002 Tonar ..................... F21S 45/47
359/267
2010/0045190 A1* 2/2010 Cramer .................. H05B 45/12
315/151
(Continued)

FOREIGN PATENT DOCUMENTS

JP 2005-338266 12/2005
JP 2005-343332 12/2005
(Continued)

OTHER PUBLICATIONS

Japanese Notice of Allowance for Japanese Patent Application No. 2019-147938 dated Dec. 8, 2020.

*Primary Examiner* — Jonathan M Blancha
(74) *Attorney, Agent, or Firm* — Amin, Turocy & Watson, LLP

(57) ABSTRACT

A display control device includes: an illuminance acquisition unit configured to acquire surrounding illuminance of a display unit on the basis of one or both of first illuminance detected by a first illuminance sensor and second illuminance detected by a second illuminance sensor; a storage unit configured to store correspondence information in which illuminance is associated with target luminance; a luminance control unit configured to control luminance of a screen of the display unit on the basis of the acquired illuminance and the correspondence information; and an abnormality detection unit configured to detect an abnormality of at least the first illuminance sensor. The luminance control unit acquires the target luminance associated with the surrounding illuminance of the display unit from the correspondence information on the basis of the surrounding illuminance when the abnormality of the first illuminance sensor is not detected. The luminance control unit acquires the target luminance on the basis of information in which one or both of the second illuminance and the correspon-
(Continued)

dence information is corrected and performs control such that the luminance of the screen of the display unit becomes the target luminance when the abnormality of the first illuminance sensor is detected.

9 Claims, 8 Drawing Sheets

(51) Int. Cl.
  *G01J 1/58* (2006.01)
  *G01J 1/02* (2006.01)
  *G02B 27/01* (2006.01)
  *B60K 35/00* (2006.01)

(52) U.S. Cl.
  CPC .. *G02B 27/0101* (2013.01); *B60K 2370/1529* (2019.05); *B60K 2370/349* (2019.05); *G09G 2320/0626* (2013.01); *G09G 2360/141* (2013.01); *G09G 2360/144* (2013.01); *G09G 2380/10* (2013.01)

(58) Field of Classification Search
  USPC .......................................................... 345/207
  See application file for complete search history.

(56) References Cited

U.S. PATENT DOCUMENTS

| | | | |
|---|---|---|---|
| 2014/0293169 A1* | 10/2014 | Uken | B60R 1/12 349/12 |
| 2016/0358530 A1* | 12/2016 | Schuch | G09G 3/20 |
| 2016/0372053 A1 | 12/2016 | Lee et al. | |
| 2019/0258131 A9* | 8/2019 | Lynam | G02F 1/153 |
| 2019/0362688 A1* | 11/2019 | Wang | G06F 3/0484 |

FOREIGN PATENT DOCUMENTS

| | | |
|---|---|---|
| JP | 4588936 | 12/2010 |
| JP | 2012-100203 | 5/2012 |
| JP | 2015-178297 | 10/2015 |

\* cited by examiner

152

| LUMINANCE [Lx] | TARGET LUMINANCE [cd/m²] |
|---|---|
| I001 | L001 |
| I002 | L002 |
| ... | ... |

DISPLAY CONTROL DEVICE, DISPLAY CONTROL METHOD, AND STORAGE MEDIUM CAPABLE OF PERFORMING APPROPRIATE LUMINANCE ADJUSTMENT IN CASE WHERE ABNORMALITY OF ILLUMINANCE SENSOR IS DETECTED

CROSS-REFERENCE TO RELATED APPLICATION

Priority is claimed on Japanese Patent Application No. 2019-147938, filed Aug. 9, 2019, the content of which is incorporated herein by reference.

BACKGROUND

Field of the Invention

The present invention relates to a display control device, a display control method, and a storage medium.

Description of Related Art

In the related art, technologies for adjusting luminance of a screen of a display device on the basis of surrounding illuminance of the display device detected by a plurality of illuminance sensors are known (for example, see Japanese Patent No. 4588936 and Japanese Unexamined Patent Application, First Publication No. 2005-343332).

SUMMARY

In the technology of the related art, however, cases in which an abnormality of illuminance sensors is detected have not been considered. Therefore, appropriate luminance adjustment may not be performed in some cases.

The present invention is devised in view of such circumstances and an objective of the present invention is to provide a display control device, a display control method, and a storage medium capable of performing more appropriate luminance adjustment.

The following aspects of the present invention have been adopted to achieve objectives related to the above problems.

(1) According to an aspect of the present invention, a display control device includes: an illuminance acquisition unit configured to acquire surrounding illuminance of a display unit on the basis of one or both of first illuminance detected by a first illuminance sensor and second illuminance detected by a second illuminance sensor; a storage unit configured to store correspondence information in which illuminance is associated with target luminance; a luminance control unit configured to control luminance of a screen of the display unit on the basis of the illuminance acquired by the illuminance acquisition unit and the correspondence information stored in the storage unit; and an abnormality detection unit configured to detect an abnormality of at least the first illuminance sensor. The luminance control unit acquires the target luminance associated with the surrounding illuminance of the display unit from the correspondence information on the basis of the surrounding illuminance of the display unit when the abnormality detection unit does not detect the abnormality of the first illuminance sensor. The luminance control unit acquires the target luminance on the basis of information in which one or both of the second illuminance and the correspondence information is corrected when the abnormality detection unit detects the abnormality of the first illuminance sensor. The luminance control unit performs control such that the luminance of the screen of the display unit becomes the target luminance.

(2) According to the aspect (1) of the present invention, the display unit may be mounted in a vehicle. The second illuminance sensor may detect illuminance by light on a rear side in front and rear directions of the vehicle.

(3) According to the aspect (1) or (2) of the present invention, the display unit may be mounted in a vehicle. The first illuminance sensor may be installed at a position at which illuminance by light transmitting through a front windshield of the vehicle is detected more easily than the second illuminance sensor inside the vehicle.

(4) According to any one of the aspects (1) to (3) of the present invention, the display unit may be mounted in a vehicle. The second illuminance sensor may be installed near the display unit and may be installed so that a detection region on a rear side of the vehicle in front and rear directions of the vehicle is broader than a detection region on a front side of the vehicle.

(5) According to any one of the aspects (1) to (4) of the present invention, the luminance control unit may acquire the target luminance from the correspondence information on the basis of a value obtained by correcting the second illuminance to be a predetermined times when the abnormality detection unit detects the abnormality of the first illuminance sensor.

(6) According to any one of the aspects (1) to (5) of the present invention, the storage unit may store first correspondence information in which the surrounding illuminance of the display unit is associated with the target luminance and second correspondence information in which the second illuminance is associated with the target luminance. The luminance control unit may acquire the target luminance associated with the surrounding illuminance of the display unit from the first correspondence information on the basis of the surrounding illuminance of the display unit when the abnormality detection unit does not detect the abnormality of the first illuminance sensor. The luminance control unit may acquire the target luminance associated with the second illuminance from the second correspondence information on the basis of the second illuminance when the abnormality detection unit detects the abnormality of the first illuminance sensor.

(7) According to any one of the aspects (1) to (5) of the present invention, the abnormality detection unit may detect an abnormality of the second illuminance sensor. The luminance control unit may acquire the target luminance from the correspondence information based on the first illuminance when the abnormality detection unit detects the abnormality of the second illuminance sensor and does not detect the abnormality of the first illuminance sensor.

(8) According to any one of the aspects (1) to (7) of the present invention, the display unit may be mounted in a vehicle. The display control device may further include a backlight determination unit configured to determine whether an interior environment of the vehicle is a backlight state. The luminance control unit may not correct the second illuminance or the correspondence information when the backlight determination unit detects the interior environment is the backlight state and the abnormality detection unit detects the abnormality of the first illuminance sensor.

(9) According to another aspect of the present invention, a display control method causes a computer to perform: acquiring surrounding illuminance of a display unit on the basis of one or both of first illuminance detected by a first illuminance sensor and second illuminance detected by a second illuminance sensor; controlling luminance of a screen of the display unit on the basis of the acquired illuminance and correspondence information in which illuminance stored in a storage unit is associated with target luminance; detecting an abnormality of at least the first illuminance sensor; acquiring the target luminance associated with the surrounding illuminance of the display unit from the correspondence information on the basis of the surrounding illuminance of the display unit when the abnormality of the first illuminance sensor is not detected; acquiring the target luminance on the basis of information in which one or both of the second illuminance and the correspondence information is corrected when an abnormality of the first illuminance sensor is detected; and performing control such that the luminance of the screen of the display unit becomes the target luminance.

(10) According to still another aspect of the present invention, a computer-readable non-transitory storage medium stores a program causing a computer to perform: acquiring surrounding illuminance of a display unit on the basis of one or both of first illuminance detected by a first illuminance sensor and second illuminance detected by a second illuminance sensor; controlling luminance of a screen of the display unit on the basis of the acquired illuminance and correspondence information in which illuminance stored in a storage unit is associated with target luminance; detecting an abnormality of at least the first illuminance sensor; acquiring the target luminance associated with the surrounding illuminance of the display unit from the correspondence information on the basis of the surrounding illuminance of the display unit when the abnormality of the first illuminance sensor is not detected; acquiring the target luminance on the basis of information in which one or both of the second illuminance and the correspondence information is corrected when an abnormality of the first illuminance sensor is detected; and performing control such that the luminance of the screen of the display unit becomes the target luminance.

According to the aspects (1) to (10) of the present invention, it is possible to perform more appropriate luminance adjustment.

DETAILED DESCRIPTION

Hereinafter, embodiments of a display control device, a display control method, and a storage medium according to the present invention will be described with reference to the drawings. Hereinafter, a display control device adjusting luminance of a screen of a display device mounted in a vehicle will be described. The "display device mounted in the vehicle" is a display device used inside the vehicle and includes not only a display device mounted on a predetermined portion inside the vehicle but also a display device detachably mounted on the predetermined portion.

First Embodiment

Figure 1:
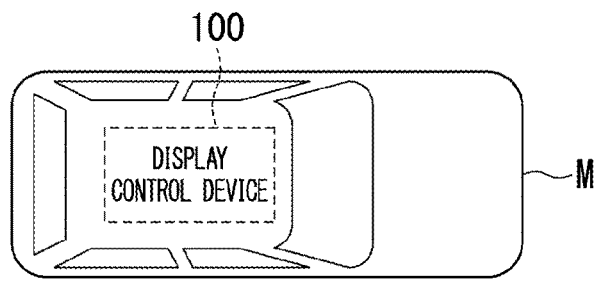
FIG. 1 is a schematic diagram illustrating a vehicle including a display control device according to a first embodiment.

FIG. 1 is a schematic diagram illustrating a vehicle M including a display control device 100 according to a first embodiment. The vehicle M is, for example, a vehicle such as a two-wheeled vehicle, a three-wheeled vehicle, or a four-wheeled vehicle. A driving source of the vehicle M includes an internal combustion engine such as a diesel engine or a gasoline engine, an electric motor, or a combination thereof. The electric motor operates using power generated by a power generator connected to the internal combustion engine or power discharged from a secondary cell or a fuel cell. The display control device 100 controls a display device mounted in the vehicle M. The display control device 100 may acquire information from another in-vehicle device mounted in the vehicle M and control the display device on the basis of the acquired information.

Figure 2:
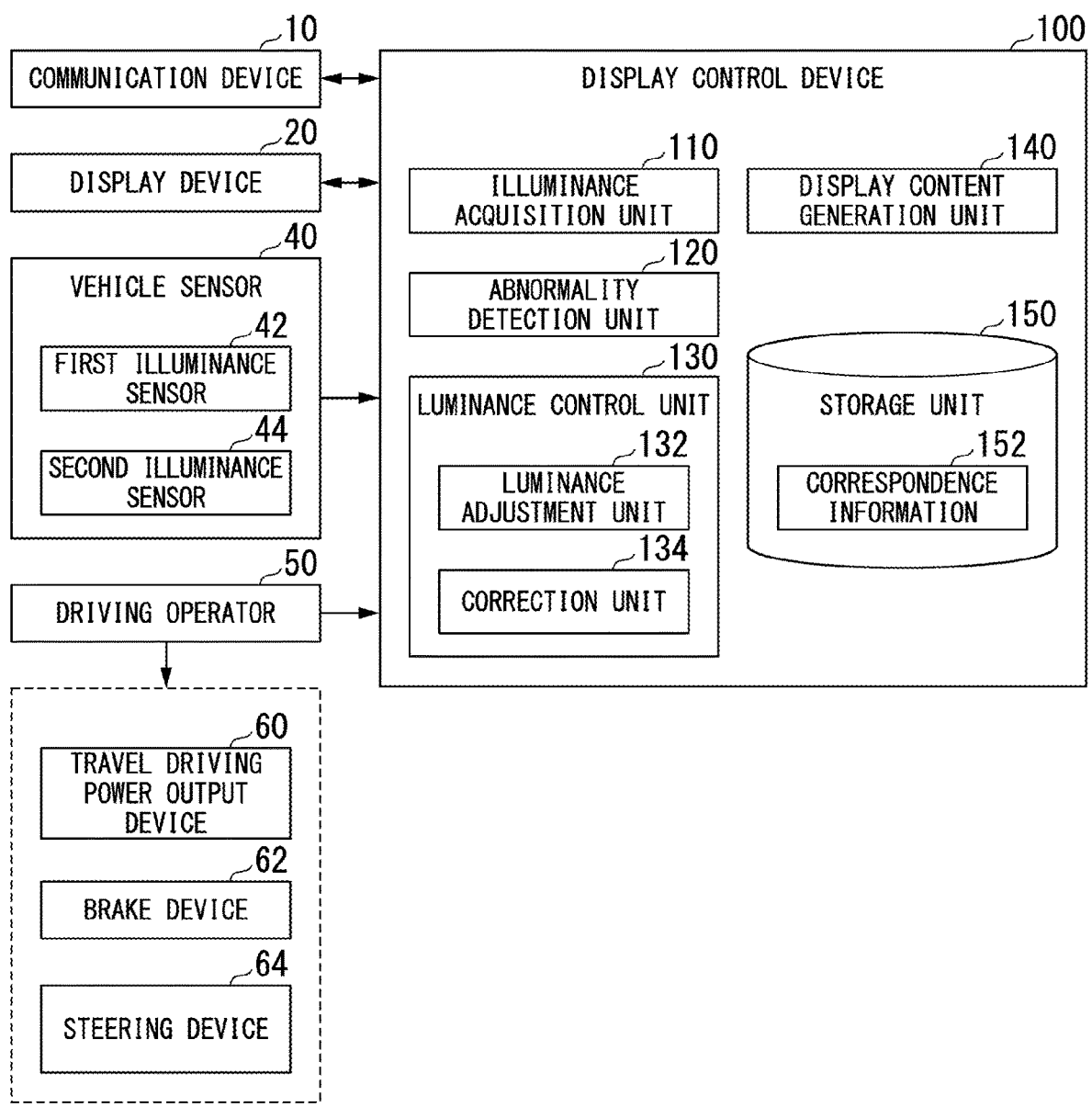
FIG. 2 is a diagram illustrating a configuration of the display control device according to the first embodiment.

FIG. 2 is a diagram illustrating a configuration of the display control device 100 according to the first embodiment. FIG. 2 illustrates the display control device 100 and a communication device 10, a display device (an example of a display unit) 20, a vehicle sensor 40, a driving operator 50, a travel driving power output device 60, a brake device 62, and a steering device 64 as examples of in-vehicle devices other than the display control device 100 mounted in the vehicle M.

The communication device 10 communicates with other devices or external devices near the vehicle M and a terminal device (for example, a smartphone or a tablet terminal) carried by an occupant of the vehicle M by using, for example, a cellular network, a Wi-Fi network, Bluetooth (registered trademark), dedicated short range communication (DSRC), or the like.

The display device 20 is, for example, a display device such as a liquid crystal display (LCD) or an organic electro luminescence (EL) display device. The display device 20 may be a touch panel that includes a reception unit receiving operation content of an occupant. One or more display devices 20 are installed at any positions inside a vehicle. For example, the display device 20 is installed near a front side of a driver seat on an instrument panel inside the vehicle M and is installed at a position that an occupant can see through a gap of a steering wheel or over the steering wheel (hereinafter, the display device 20 installed at this position is referred to as a "meter display unit"). The display device 20 may be installed near the middle of the instrument panel (hereinafter, the display device installed at this position is referred to as a central display unit). The display device 20 may be a head-up display (HUD) device. The HUD device is a device that causes an image (including a still image or a moving image) to overlap a landscape so that the occupant sees the image, and is, for example, a device that causes light including an image to be transmitted through a front windshield or a combiner of the vehicle M so that an observer (a user) sees a virtual image. The user is, for example, a driver or may be an occupant other than the driver. The display device 20 may be an indicator such as a lamp indicating a state or a situation of the vehicle M.

For example, a speed of the vehicle M, an engine speed, a remaining fuel amount, a radiator water temperature, a traveling distance, or other information is displayed on the display device 20. Such an image is displayed on, for example, a meter display unit. The display device 20 may display an image of a route to a destination set by a navigation device (not illustrated) mounted in the vehicle M or content such as a television program received by the communication device 10 or a downloaded image. Such an image is displayed on, for example, a center display unit. The display device 20 controls luminance of the displayed image on the basis of control information from the display control device 100.

The display device 20 includes an electronic control unit (ECU) that controls each unit inside the device. The ECU acquires information regarding current luminance (set luminance) of a screen displaying an image (luminance information) and outputs the acquired luminance information to the display control device 100. The ECU displays an image obtained from the display control device 100 or an image on the basis of the control information or controls luminance of the screen.

The vehicle sensor 40 is a detection unit that acquires a surrounding environment of the vehicle M or various kinds of information regarding a position, a behavior, and the like of the vehicle M. The vehicle sensor 40 includes, for example, a first illuminance sensor 42 and a second illuminance sensor 44. The first illuminance sensor 42 and the second illuminance sensor 44 each detect surrounding illuminance of the display device 20. The surroundings are, for example, a region within a predetermined range from an object serving as a standard. The surroundings include, for example, not only surroundings of the display device 20 but also surroundings of a user (for example, an occupant of the vehicle) and external surroundings of the vehicle M. One or more first illuminance sensors 42 and second illuminance sensors 44 are each installed at any positions of the vehicle M.

Figure 3:
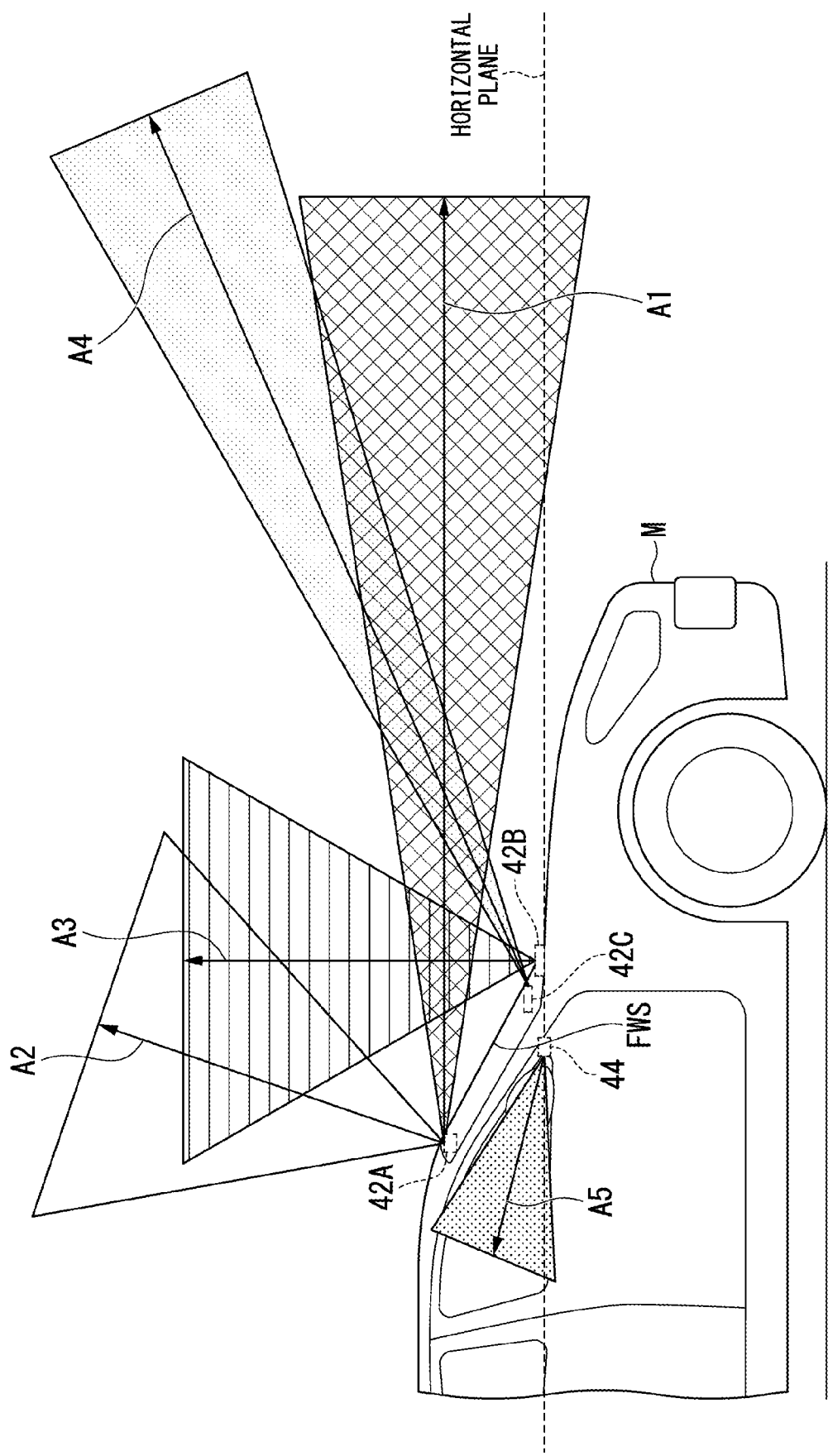
FIG. 3 is a diagram illustrating installation positions of first and second illuminance sensors and illuminance detection directions according to the first embodiment.

FIG. 3 is a diagram illustrating installation positions of the first illuminance sensor 42 and the second illuminance sensor 44 and illuminance detection directions according to the first embodiment. In the example of FIG. 3, three first illuminance sensors 42A to 42C are illustrated as examples of the first illuminance sensors in the schematic diagram of a front side of the vehicle M. The first illuminance sensors 42A to 42C are installed at positions at which illuminance of light transmitted through a front windshield FWS of the vehicle M from the second illuminance sensor 44 is easily detected inside the vehicle M.

The first illuminance sensor 42A is installed on, for example, an upper portion of the front windshield FWS or the rear surface of a rearview mirror inside the vehicle. The first illuminance sensor 42B is installed on, for example, an instrument panel inside the vehicle. The first illuminance sensor 42C is installed in, for example, a vehicle front direction of the HUD device. The first illuminance sensor 42C may be embedded in the HUD device. In the vehicle M, at least one of the first illuminance sensors 42A to 42C illustrated in FIG. 3 is installed. Hereinafter, illuminance detected by each of the first illuminance sensors 42A to 42C is referred to as "first illuminance."

The first illuminance sensors 42A to 42C detect t the first illuminance of the surroundings of the vehicle M (for example, the outside in the front direction) or a region in a front direction inside the vehicle from light mainly transmitted through the front windshield FWS. The first illuminance sensor 42A detects, for example, the first illuminance in one or both of a front direction A1 and a front ascending direction A2 of the vehicle M from the installation position. The first illuminance sensor 42B detects, for example, the first illuminance in an upper direction A3 of the vehicle M from the installation position. The first illuminance sensor 42C detects, for example, the first illuminance in a front ascending direction (a direction closer to the horizontal plane side than the direction A2) A4 of the vehicle M from the installation position. The first illuminance sensors 42A to 42C may detect, for example, an outside light lamp of the vehicle M turning on or off or may determine intensity of a wiper.

The second illuminance sensor 44 is installed, for example, near the meter display unit or the center display unit (for example, a position within a predetermined distance from the meter display unit or the center display unit). The second illuminance sensor 44 may be embedded in the meter display unit or the center display unit.

The second illuminance sensor 44 detects second illuminance from light on the rear side in the front and rear directions of the vehicle M. The second illuminance sensor 44 detects illuminance in a rear direction A5 of the vehicle M from the installation position, as illustrated in FIG. 3. The second illuminance sensor 44 is installed, for example, so that a detection region on the rear side of the vehicle M is broader than a detection region on the front side of the vehicle M in the front and rear directions of the vehicle M. The second illuminance sensor 44 mainly detects surrounding illuminance of the display device 20 or an occupant who is inside the vehicle.

The installation positions or the numbers of the first illuminance sensors 42 and second illuminance sensors 44 are not limited thereto in a detection direction of the illuminance. For example, an illuminance sensor that detects the lateral side or the rear side of the vehicle M may be installed. The first illuminance sensor 42 and the second illuminance sensor 44 detect illuminance continuously at a predetermined timing and output detection results to the display control device 100.

Referring back to FIG. 2, the vehicle sensor 40 includes not only the first illuminance sensor 42 and the second illuminance sensor 44 but also a position sensor that acquires a position of the vehicle M, a vehicle speed sensor that detects a speed of the vehicle M, an acceleration sensor that detects acceleration of the vehicle M, a yaw rate sensor that detects angular velocity around a vertical axis, and an azimuth sensor that detects a direction of the vehicle M. The position sensor includes, for example, a global navigation satellite system (GNSS) receiver. The GNSS receiver specifies a position of the vehicle M on the basis of a signal received from the GNSS satellite. The position of the vehicle M may be specified or complemented by, for example, an inertial navigation system (INS) using an output of another sensor included in the vehicle sensor 40. The vehicle sensor 40 detects data continuously at a predetermined timing and outputs a detection result to the display control device 100.

The driving operator 50 includes, for example, an accelerator pedal, a brake pedal, a shift lever, a steering wheel, a heteromorphic steering wheel, a joystick, and other operators. A sensor that detects whether there is an operation or an operation amount is mounted in the driving operator 50 and a detection result is output to some or all of the travel driving power output device 60, the brake device 62, and the steering device 64 of the vehicle M. An occupant operates the driving operator 50 to cause the vehicle M to travel.

The travel driving power output device 60 outputs travel driving power (torque) for the vehicle M to travel to a driving wheel. The travel driving power output device 60 includes, for example, a combination of an internal combustion engine, an electric motor, and a transmission and an ECU controlling them. The ECU controls the foregoing configuration in accordance with information input from the driving operator 50. The brake device 62 includes, for example, a brake caliper, a cylinder that transmits a hydraulic pressure to the brake caliper, an electronic motor that generates a hydraulic pressure for the cylinder, and a brake ECU. The brake ECU controls the electric motor in accordance with information input from the driving operator 50 such that a brake torque in accordance with a brake operation is output to each wheel. The steering device 64 includes, for example, a steering ECU and an electric motor. The electric motor applies a force to, for example, a rack and pinion mechanism to change a direction of a steering wheel. The steering ECU drives the electric motor to change the direction of the steering wheel in accordance with information input from the driving operator 50. The information received by the driving operator 50 is output to the display control device 100.

The display control device 100 includes, for example, an illuminance acquisition unit 110, an abnormality detection unit 120, a luminance control unit 130, a display content generation unit 140, and a storage unit 150. Each constituent element except for the storage unit 150 of the display control device 100 is realized, for example, by causing a hardware processor such as a central processing unit (CPU) to execute a program (software). Some or all of the constituent elements may be realized by hardware (a circuit unit including circuitry) such as a large scale integration (LSI), an application specific integrated circuit (ASIC), a field-programmable gate array (FPGA), or a graphics processing unit (GPU) or may be realized by software and hardware in cooperation. The program may be stored in advance in a storage device (a storage device including a non-transitory storage medium) such as an HDD or a flash memory of the display control device 100 or may be stored in a detachably mounted storage medium (a storage device including a non-transitory storage medium) such as a DVD, a CD-ROM, or the like so that the storage medium can be mounted in a drive device to be installed on the HDD or the flash memory of the display control device 100.

The storage unit 150 is realized by the foregoing various storage devices or an electrically erasable programmable read-only memory (EEPROM), a read-only memory (ROM), a random access memory (RAM), or the like. The storage unit 150 stores, for example, correspondence information 152, a program, and various other kinds of information.

Figures 4, 5:
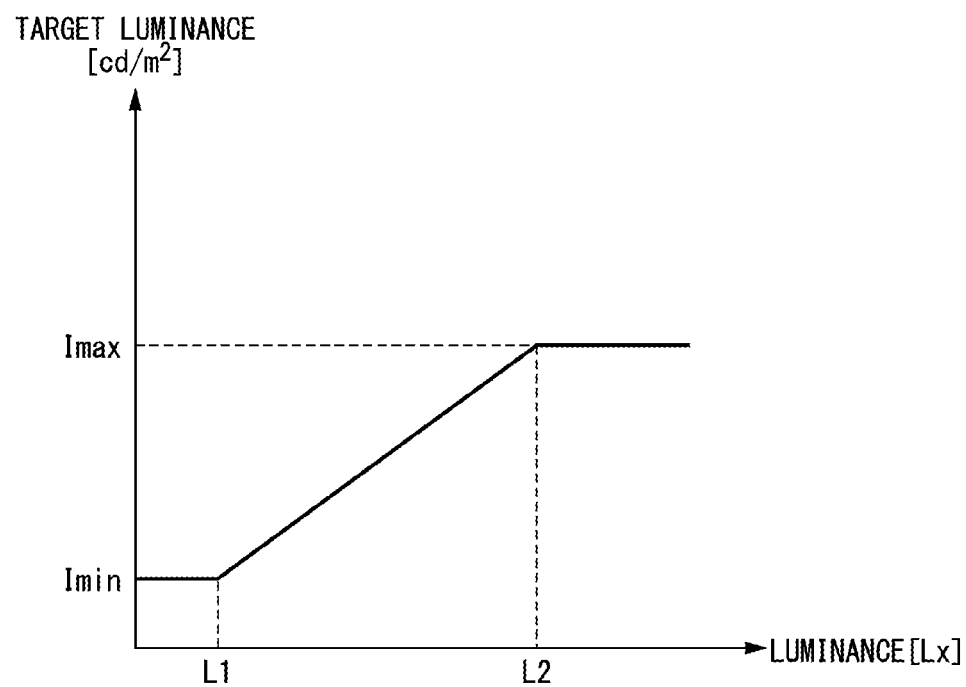
FIG. 4 is a diagram illustrating an example of content of correspondence information according to the first embodiment.
FIG. 5 is a diagram illustrating another example of the content of the correspondence information according to the first embodiment.

FIG. 4 is a diagram illustrating an example of content of the correspondence information 152 according to the first embodiment. In the correspondence information 152, a target luminance which is a target value of luminance (brightness) [cd/m$^2$] of a screen of the display device 20 is associated with illuminance [Lx]. In the example of FIG. 4, I001, I002, L001, and L002 indicate numerical values. In the correspondence information 152, a target luminance may be set for each illuminance within a predetermined range. In the correspondence information 152, a minimum value or a maximum value of the target luminance may be set in accordance with an index value indicating performance of the display device 20 or easiness of view of a displayed image.

The correspondence information 152 may be information used to derive luminance with respect to illuminance using a predetermined function or the like. FIG. 5 is a diagram illustrating another example of the content of the correspondence information 152 according to the first embodiment. In the example of FIG. 5, the horizontal axis represents illuminance [Lx] and the vertical axis represents target luminance [cd/m$^2$] of the screen of the display device 20. In the example of FIG. 5, the target luminance changes linearly (increases) from illuminance L1 to illuminance L2 in accordance with a straight line by a linear function. Instead of this, the target luminance may change using a quadratic function or an exponential function or luminance may change step by step for each illuminance within a predetermined range. In the correspondence information 152 shown in the example of FIG. 5, the target luminance is a minimum luminance Imin when the illuminance is equal to or less than the illuminance L1. The target luminance is a maximum luminance Imax when the illuminance is equal to or greater than the illuminance L2. The minimum luminance Imin or the maximum luminance Imax is set in accordance with an index value or the like indicating performance of the display device 20 or easiness of view of a displayed image, as described above. The correspondence information 152 may be downloaded from an external device connected via the communication device 10 to be updated or acquired.

The illuminance acquisition unit 110 acquires surrounding illuminance of the display device 20 based on one or both of the first illuminance detected by the first illuminance sensor 42 and the second illuminance detected by the second illuminance sensor 44. When there are the plurality of first illuminance sensors 42 and the plurality of second illuminance sensors 44, the illuminance acquisition unit 110 may set a maximum value or an average value of the illuminance acquired from the sensors as the surrounding illuminance. The illuminance acquisition unit 110 may calculate the surrounding illuminance by weighting the acquired illuminance in accordance with a type of illuminance sensor, an installation position of the illuminance sensor, or an illuminance detection direction. For example, the illuminance acquisition unit 110 can set the surrounding illuminance to a value close to illuminance acquired from the first illuminance sensor 42 by setting the weight of the first illuminance to be greater than the second illuminance and calculating the surrounding illuminance. In this case, the first illuminance sensor 42 functions as a main sensor and the second illuminance sensor functions as a sub-sensor.

The abnormality detection unit 120 detects an abnormality of at least the first illuminance sensor 42 on the basis of the illuminance acquired by the illuminance acquisition unit 110. The abnormality includes a temporary abnormality which can be resolved after a predetermined time or abnormality for which it is necessary to repair or exchange the sensor. For example, the abnormality detection unit 120 detects an abnormality of the first illuminance sensor 42 when the first illuminance acquired by the illuminance acquisition unit 110 and detected by the first illuminance sensor 42 is not included within a predetermined first illuminance range. When the illuminance from the first illuminance sensor 42 cannot be acquired for a predetermined time or more, the abnormality detection unit 120 detects the abnormality of the first illuminance sensor 42. When the first illuminance sensor 42 has a state monitoring function, the abnormality detection unit 120 may detect the abnormality from information from the state monitoring function (status information).

The abnormality detection unit 120 may detect the abnormality of the first illuminance sensor 42 and may also detect the abnormality of the second illuminance sensor 44. In this case, the abnormality detection unit 120 detects an abnormality of the second illuminance sensor 44 when the second illuminance acquired by the illuminance acquisition unit 110 and detected by the second illuminance sensor 44 is not included within a predetermined second illuminance range or when the illuminance from the second illuminance sensor 44 cannot be acquired for a predetermined time or more. When the second illuminance sensor 44 has a state monitoring function, the abnormality detection unit 120 may detect the abnormality from information from the state monitoring function (status information).

The luminance control unit 130 controls luminance of a screen of the display device 20. For example, the luminance control unit 130 includes, for example, a luminance adjustment unit 132 and a correction unit 134. When there is no abnormality in at least the first illuminance sensor 42 based on a detection result by the abnormality detection unit 120, the luminance adjustment unit 132 acquires the target luminance associated with illuminance which matches or is most similar with reference to the illuminance included in the correspondence information 152 stored in the storage unit 150 using the surrounding illuminance of the display device 20 acquired by the illuminance acquisition unit 110. When the abnormality detection unit 120 detects the abnormality of the first illuminance sensor 42, the luminance adjustment unit 132 causes the correction unit 134 to be described below to perform a predetermined correction process on one or both of the second illuminance and the correspondence information 152 and then to acquire the target luminance on the basis of the second illuminance and the correspondence information.

The luminance adjustment unit 132 may derive an adjustment value for changing current luminance to the target luminance on the basis of a difference value between the target luminance and the current luminance acquired from the display device 20. The luminance adjustment unit 132 generates control information for linearly changing the luminance of the display device 20 to the target luminance at a predetermined change speed on the basis of the target luminance or the adjustment value and outputs the generated control information to the display device 20. The predetermined change speed may be a fixed speed or may be set to be variable in accordance with a change in a surrounding environment (lightness) of the vehicle M.

When the abnormality detection unit 120 detects the abnormality of the first illuminance sensor 42, the correction unit 134 corrects one or both of the second illuminance and the correspondence information 152 stored in the storage unit 150. For example, the correction unit 134 performs correction by setting the second illuminance to a predetermined factor (for example, multiplying by $\alpha$). The correction unit 134 may generate corrected correspondence information in which the illuminance included in the correspondence information 152 is divided by a predetermined value (for example, $\beta$). The correction unit 134 may generate corrected correspondence information in which the luminance included in the correspondence information 152 is multiplied by a predetermined value (for example, $\gamma$). In this case, the correction unit 134 adjusts the luminance multiplied by $\gamma$ so that the luminance does not exceed the maximum luminance of the display device 20. In this way, even when the abnormality of the first illuminance sensor 42 is detected, a more appropriate target luminance can be acquired using only the second illuminance. The values of $\alpha$, $\beta$, and $\gamma$ described above may be changed in accordance with a case in which one or both of the second illuminance and the correspondence information 152 is corrected or a case in which both of the second illuminance and the correspondence information 152 are corrected or may be changed in accordance with performance of the display device 20 or content or a display mode of an image displayed on the display device 20. Thus, it is possible to perform more appropriate correction.

When the abnormality detection unit 120 detects the abnormality of the second illuminance sensor 44 and does not detect an abnormality of the first illuminance sensor 42, the correction unit 134 does not correct one or both of the first illuminance and the correspondence information 152. This is because appropriate luminance adjustment can be maintained to some extent even when only the first illuminance obtained by detecting external illuminance of the vehicle M is used. In this case, the luminance adjustment unit 132 acquires the target luminance associated with the illuminance which matches or is most similar with reference to the illuminance of the correspondence information 152 using the first illuminance and adjusts the luminance of the screen of the display device 20.

The display content generation unit 140 generates display content included in an image displayed on the display device 20. The display content includes, for example, information acquired from each of the communication device 10, the display device 20, the vehicle sensor 40, and the driving operator 50 or information generated on the basis of the acquired information. The display content may include information acquired from a navigation device (not illustrated), an air conditioning device (not illustrated), a DVD reproduction device (not illustrated), or another in-vehicle device mounted in the vehicle. The display content may include information indicating that the abnormality detection unit 120 detects an abnormality or information regarding a kind or position of an illuminance sensor of which an abnormality is detected. The display content may include information regarding a display mode such as information indicating which information is displayed at which position on a screen of the display device 20. The display content generation unit 140 generates an image or control information corresponding to the generated display content and outputs the generated image or control information to the display device 20.

[Process Flow]

Figure 6:
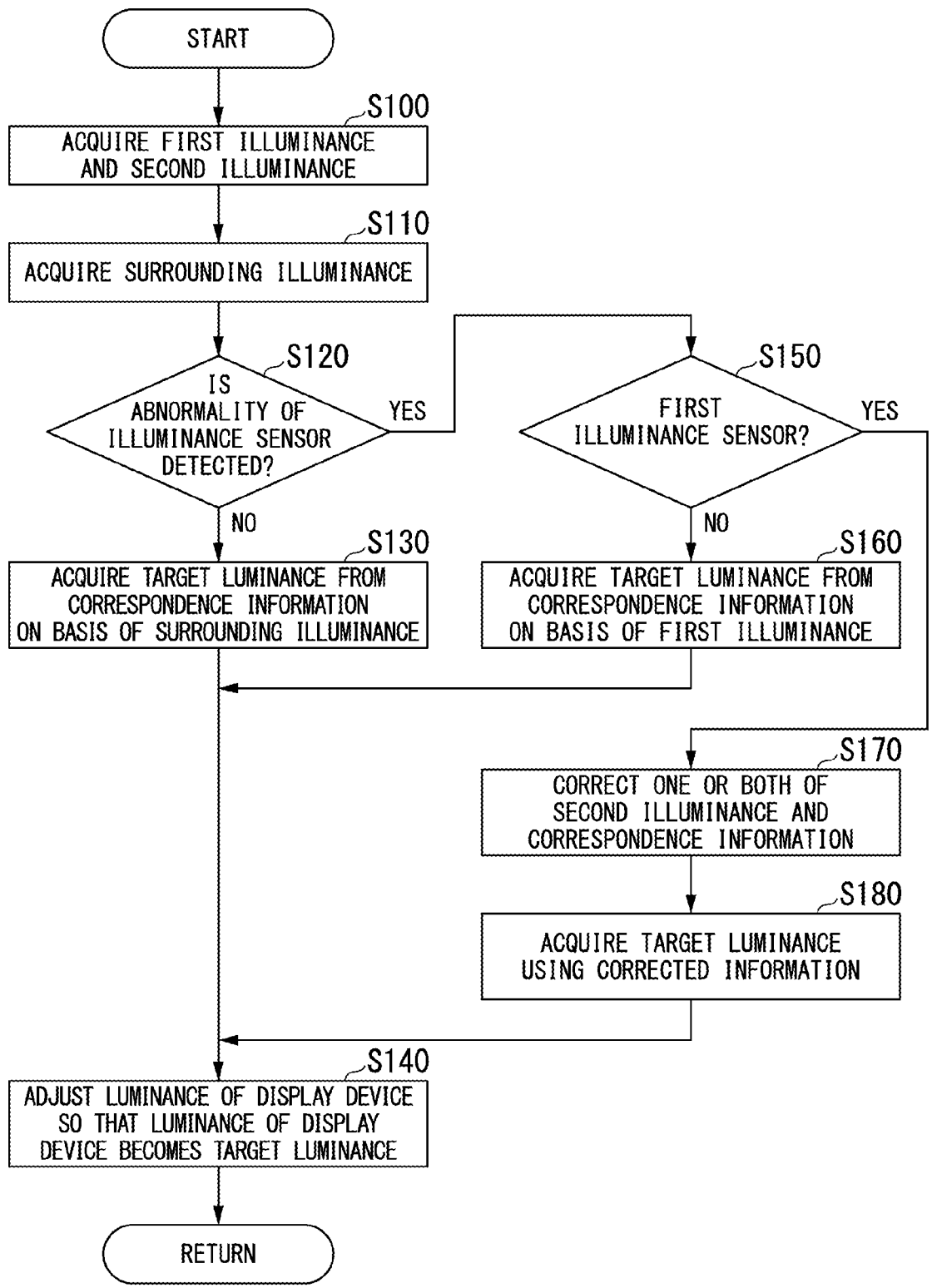
FIG. 6 is a flowchart illustrating an example of a flow of a process in the display control device according to the first embodiment.

FIG. 6 is a flowchart illustrating an example of a flow of a process in the display control device 100 according to the first embodiment. Hereinafter, luminance control will be mainly described among processes performed in the display control device 100. The process illustrated in FIG. 6 is performed repeatedly at a predetermined timing, for example, while an image is displayed on the display device 20. The predetermined timing is, for example, a case in which a luminance control instruction is received at a predetermined period or from a user (an occupant of the vehicle M).

In the example of FIG. 6, the illuminance acquisition unit 110 acquires the first illuminance and the second illuminance from the first illuminance sensor 42 and the second illuminance sensor 44 (step S100). Subsequently, the illuminance acquisition unit 110 acquires surrounding illuminance of the display device 20 on the basis of the first illuminance and the second illuminance (step S110). Subsequently, the abnormality detection unit 120 determines whether abnormality of the illuminance sensor (the first illuminance sensor 42 or the second illuminance sensor 44) is detected (step S120).

When it is determined that the abnormality of the illuminance sensor is not detected, the luminance adjustment unit 132 acquires the target luminance from the correspondence information 152 stored in the storage unit 150 on the basis of the surrounding illuminance (step S130) and adjusts the luminance of the display device 20 so that the acquired luminance of the display device 20 becomes the target luminance (step S140).

When it is determined in the process of step S120 that the abnormality of the illuminance sensor is detected, the abnormality detection unit 120 determines whether the illuminance sensor of which the abnormality is detected is the first illuminance sensor 42 (step S150). When it is determined that the abnormality of the illuminance sensor is not the first illuminance sensor 42 (that is, it is determined that the illuminance sensor of which the abnormality is detected is the second illuminance sensor 44), the luminance adjustment unit 132 acquires the target luminance from the correspondence information 152 on the basis of the first illuminance (step S160) and subsequently performs a process (a luminance adjustment process) of step S140. When it is determined in the process of step S150 that the illuminance sensor of which the abnormality is detected is the first illuminance sensor 42, the correction unit 134 corrects one or both of the second illuminance and the correspondence information 152 (step S170) and acquires the target luminance using the corrected information (step S180). Thereafter, the luminance adjustment unit 132 performs the process (the luminance adjustment process) of step S140. Then, the process of the flowchart ends.

As described above, the display control device 100 according to the first embodiment includes: the illuminance acquisition unit 110 configured to acquire surrounding illuminance of the display device 20 on the basis of one or both of the first illuminance detected by the first illuminance sensor 42 and the second illuminance detected by the second illuminance sensor 44; the storage unit 150 configured to store the correspondence information 152 in which illuminance is associated with target luminance; the luminance control unit 130 configured to control luminance of a screen of the display device 20 on the basis of the illuminance acquired by the illuminance acquisition unit 110 and the correspondence information 152 stored in the storage unit 150; and the abnormality detection unit 120 configured to detect an abnormality of at least the first illuminance sensor. The luminance control unit 130 acquires the target luminance associated with the surrounding illuminance of the display device 20 from the correspondence information 152 on the basis of the surrounding illuminance of the display device 20 when the abnormality detection unit 120 does not detect the abnormality of the first illuminance sensor. The luminance control unit 130 acquires the target luminance on the basis of information in which one or both of the second illuminance and the correspondence information 152 is corrected and performs control such that the luminance of the screen of the display deice 20 becomes the target luminance when the abnormality detection unit 120 detects the abnormality of the first illuminance sensor 42. Thus, it is possible to perform the more appropriate luminance adjustment.

According to the first embodiment, even when the luminance is adjusted by the plurality of illuminance sensors and the abnormality of one illuminance sensor (for example, the first illuminance sensor 42) is even detected, more appropriate light dimming control can be realized for a user by correcting the illuminance of another illuminance sensor (for example, the second illuminance sensor 44) of which an abnormality is not detected or correcting the correspondence information.

According to the first embodiment, for example, even when the abnormality of the first illuminance sensor 42 used as the main sensor is detected, the luminance control can continued using the second illuminance sensor 44 serving as the sub-sensor installed at the position at which illuminance by light transmitting through the front windshield FWS of the vehicle M is difficult to detect (or is not detected) than the first illuminance sensor 42.

Second Embodiment

Next, a second embodiment will be described. The second embodiment is different from the first embodiment in that the storage unit 150 separately stores the first correspondence information referred to when the abnormality detection unit 120 does not detect an abnormality of the first illuminance sensor 42 and the second correspondence information referred to when the abnormality detection unit 120 detects an abnormality of the first illuminance sensor 42. Hereinafter, the above-described difference will be mainly described. Hereinafter, similar reference numerals are given to similar constituent elements as the constituent elements of the first embodiment and specific description will be omitted herein. The same applies to description of other embodiments.

Figure 7:
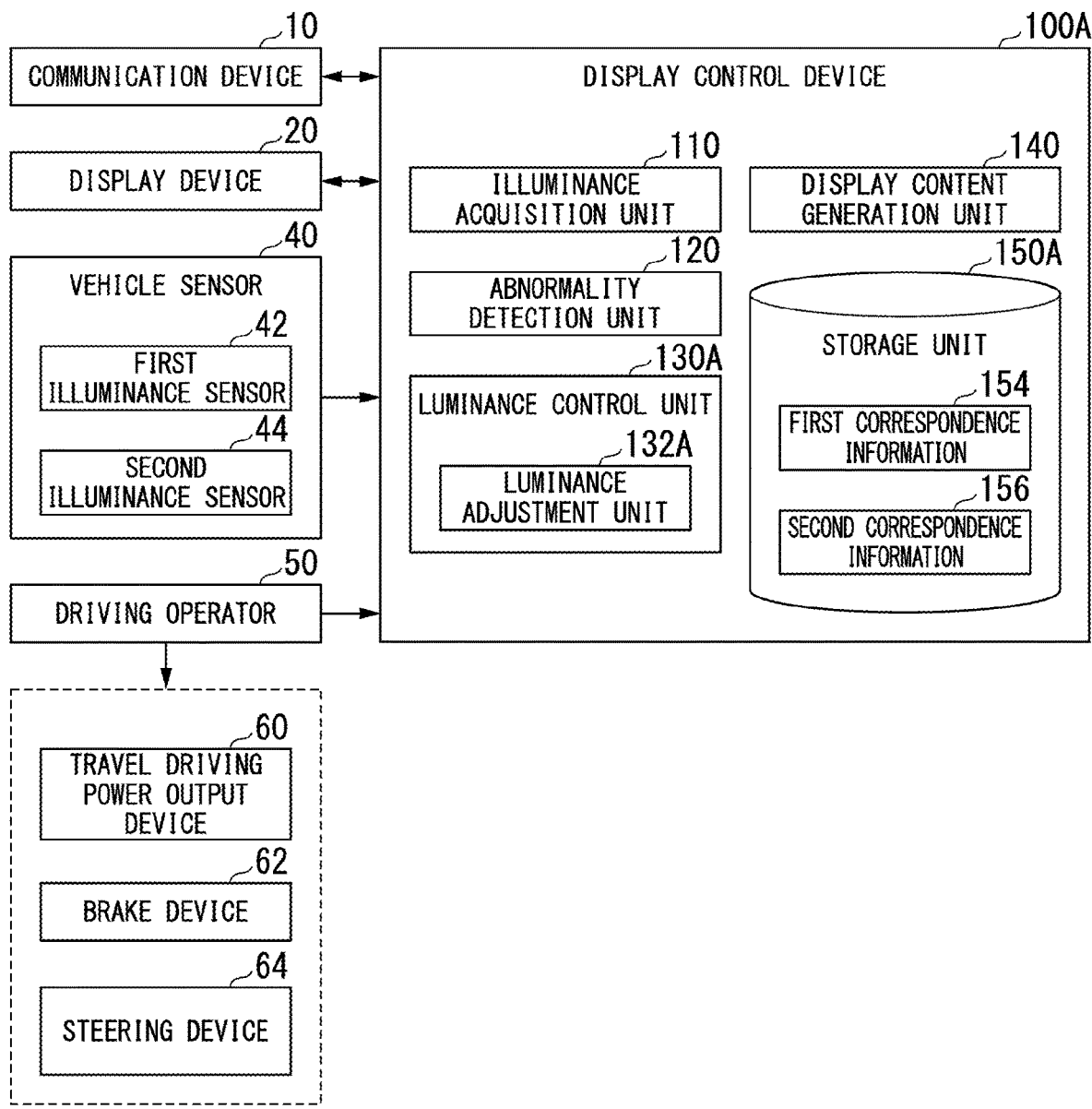
FIG. 7 is a diagram illustrating a configuration of a display control device according to a second embodiment.

FIG. 7 is a diagram illustrating a configuration of a display control device 100A according to the second embodiment. The display control device 100A includes, for example, the illuminance acquisition unit 110, the abnormality detection unit 120, a luminance control unit 130A, the display content generation unit 140, and a storage unit 150A. The display control device 100A is different from the display control device 100 according to the first embodiment in that the luminance control unit 130A and the storage unit 150A are included instead of the luminance control unit 130 and the storage unit 150. Accordingly, the function of the luminance control unit 130A and the storage unit 150A will be mainly described below.

The storage unit 150A stores, for example, first correspondence information 154, second correspondence information 156, a program, and other various kinds of information. The first correspondence information 154 is similar information to the correspondence information 152 in the first embodiment. The second correspondence information 156 is, for example, a value obtained by dividing the illuminance included in the first correspondence information 154 by a predetermined value (for example, β) or multiplying luminance included in the first correspondence information 154 by a predetermined value (for example, γ). The first correspondence information 154 and the second correspondence information 156 may be downloaded from an external device connected via the communication device 10 to be updated or acquired.

The luminance control unit 130A includes, for example, a luminance adjustment unit 132A. The luminance adjustment unit 132A controls luminance of a screen of the display device 20. When there is no abnormality in the first illuminance sensor 42 based on a detection result by the abnormality detection unit 120, the luminance adjustment unit 132A acquires the target luminance associated with illuminance which matches or is most similar with reference to the illuminance included in the first correspondence information 154 stored in the storage unit 150 using the surrounding illuminance of the display device 20 acquired by the illuminance acquisition unit 110. When the abnormality detection unit 120 detects the abnormality of the second illuminance sensor 44, the luminance adjustment unit 132A acquires the target luminance associated with the illuminance which matches or is most similar with reference to the illuminance included in the first correspondence information 154 using the first illuminance.

When the abnormality detection unit 120 detects the abnormality of the first illuminance sensor 42, the luminance adjustment unit 132A acquires the target luminance associated with the illuminance which matches or is most similar with reference to the illuminance included in the second correspondence information 156 using the second illuminance. The luminance adjustment unit 132A controls the luminance of the screen of the display device 20 such that the luminance of the screen of the display device 20 becomes the acquired target luminance.

[Process Flow]

Figure 8:
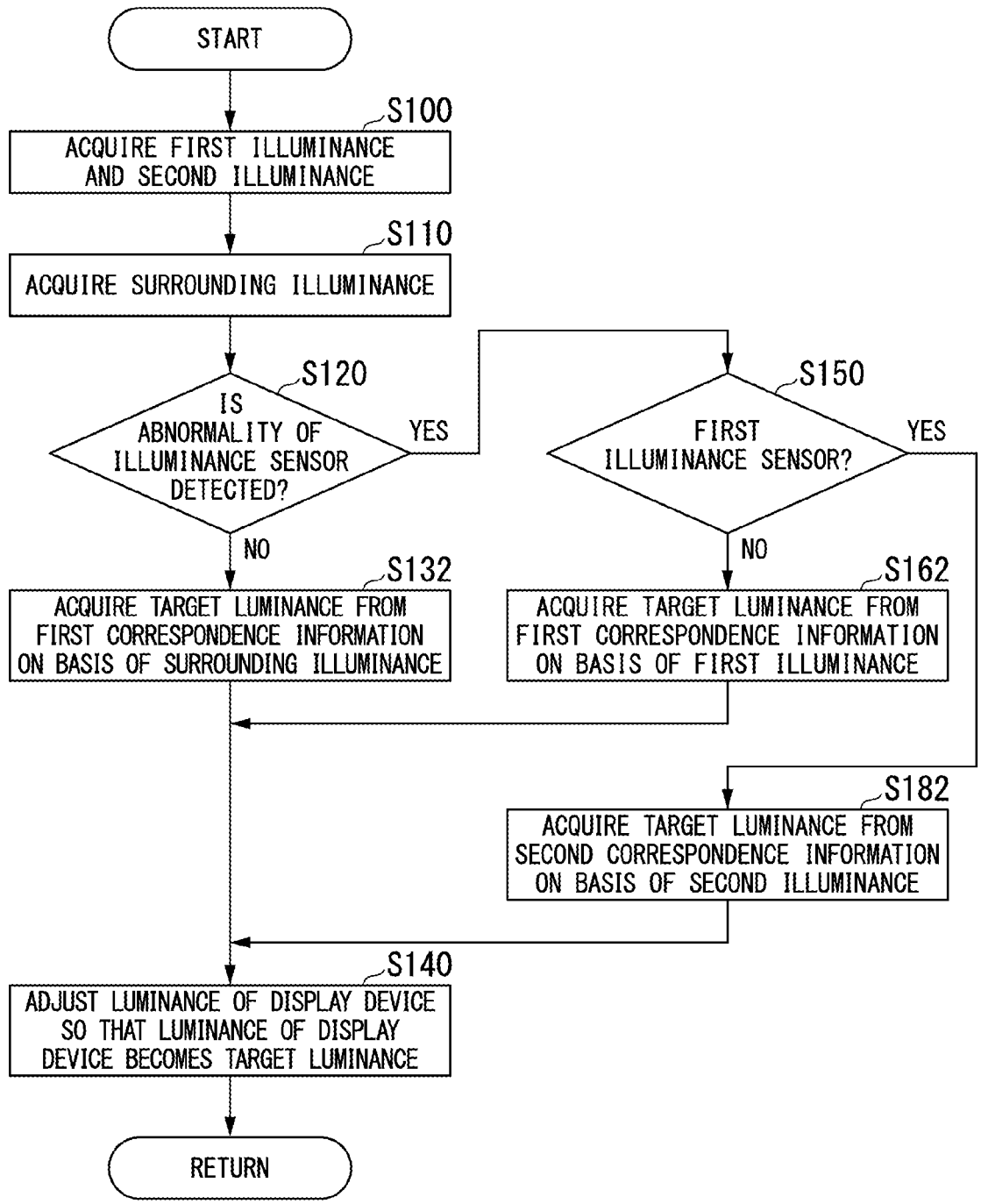
FIG. 8 is a flowchart illustrating an example of a flow of a process in the display control device according to the second embodiment.

FIG. 8 is a flowchart illustrating an example of a flow of the process in the display control device 100A according to the second embodiment. The process illustrated in FIG. 8 is different from the process of the flowchart illustrated in FIG. 6, as described above, in that there are processes of steps S132, S162, and S182 instead of the processes of steps S130, S160, and S180 and the process of step S170 is deleted. Accordingly, differences from the above description will be mainly described below.

When it is determined in the process of step S120 of FIG. 8 that the abnormality of the illuminance sensor is not detected, the luminance adjustment unit 132A acquires the target luminance from the first correspondence information 154 stored in the storage unit 150A on the basis of the surrounding illuminance (step S132) and adjusts the luminance of the display device 20 so that the acquired luminance of the display device 20 becomes the target luminance (step S140).

When it is determined in the process of step S150 that the illuminance sensor of which the abnormality is detected is not the first illuminance sensor 42 (that is, it is determined that the illuminance sensor of which the abnormality is detected is the second illuminance sensor 44), the luminance adjustment unit 132A acquires the target luminance from the first correspondence information 154 on the basis of the first illuminance (step S162) and subsequently performs a process (a luminance adjustment process) of step S140. When it is determined in the process of step S150 that the illuminance sensor of which the abnormality is detected is the first illuminance sensor 42, the luminance adjustment unit 132A acquires the target luminance from the second correspondence information 156 on the basis of the second illuminance (step S182) and subsequently performs the process of step S140.

As described above, the display control device 100A according to the second embodiment can acquire the more appropriate target luminance by switching the correspondence information referred to in accordance with whether the abnormality of the first illuminance sensor 42 is detected in addition to similar advantages to those of the first embodiment. Accordingly, in the display control device 100A, it is possible to reduce a process load at the time of detection of the abnormality.

Third Embodiment

Next, a third embodiment will be described. The third embodiment is different from the first embodiment in that there is provided a function of determining whether an interior environment of the vehicle M is a backlight state and performing luminance control on the basis of a determination result. Accordingly, the above-described differences will be mainly described below.

Figure 9:
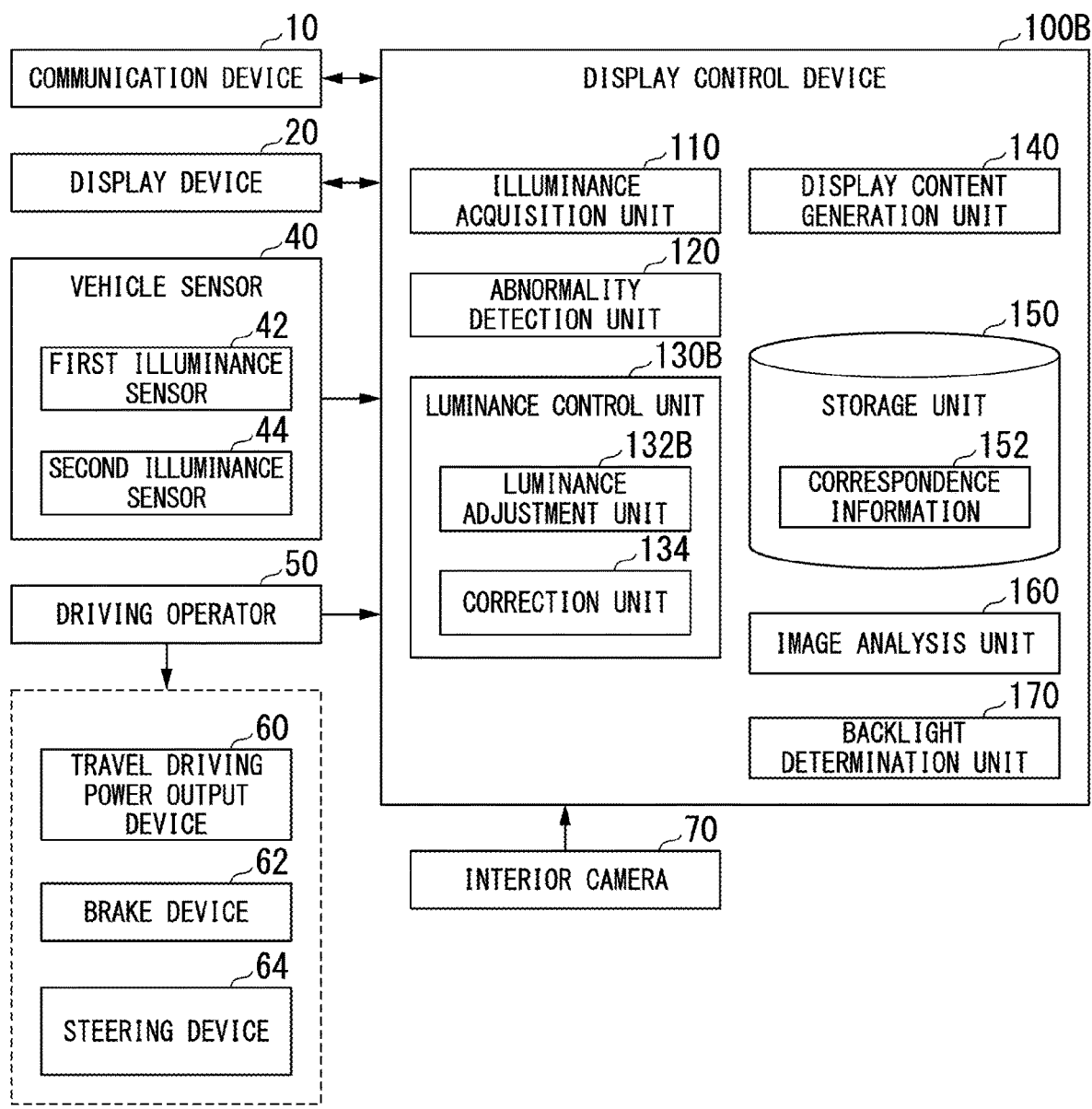
FIG. 9 is a diagram illustrating a configuration of a display control device according to a third embodiment.

FIG. 9 is a diagram illustrating a configuration of a display control device 100B according to the third embodiment. In the example of FIG. 9, as another example of an in-vehicle device of the display control device 100B, an interior camera (an example of an imaging unit) 70 is included in addition to the communication device 10, the display device 20, the vehicle sensor 40, the driving operator 50, the travel driving power output device 60, the brake device 62, and the steering device 64.

The interior camera 70 is, for example, a digital camera in which a solid-state image sensor such as a charge coupled device (CCD) or a complementary metal oxide semiconductor (CMOS) is used. The interior camera 70 may be a stereo camera. The interior camera 70 is installed in any interior portion inside the vehicle M (for example, an instrument panel, a rear-view mirror, an upper portion of a front windshield, a ceiling of the interior, or the like inside the vehicle). The interior camera 70 images a region including an occupant inside the vehicle. The interior camera 70 repeatedly images the above region periodically or images the region when an imaging instruction is received from the display control device 100B. The interior camera 70 outputs a captured image to the display control device 100B.

The display control device 100B illustrated in FIG. 9 includes, for example, the illuminance acquisition unit 110, the abnormality detection unit 120, a luminance control unit 130B, the display content generation unit 140, the storage unit 150, an image analysis unit 160, and a backlight determination unit 170. The display control device 100B is different from the display control device 100 according to the first embodiment in that the luminance control unit 130B is included instead of the luminance control unit 130 and the image analysis unit 160 and the backlight determination unit 170 are included. Accordingly, functions of the luminance control unit 130B, the image analysis unit 160, and the backlight determination unit 170 will be mainly described below.

The image analysis unit 160 analyzes an image captured by the interior camera 70 and detects a position or a state of an occupant included in the image on the basis of an analysis result. The state of the occupant is, for example, an emission state of light (for example, external light or illumination light) from the occupant. The emission state includes, for example, information regarding brightness. The state of the occupant may include a posture of an occupant or a direction of the face. The image analysis unit 160 acquires, for example, a state of an occupant by extracting feature information based on color information or edge information from the captured image and performing pattern matching on the extracted feature information and a state pattern of the occupant determined in advance.

The image analysis unit 160 may analyze brightness of a predetermined region in an interior region of the vehicle included in the image. The predetermined region is, for example, a region on the rear side and a region on the front side of a seat (for example, a driving seat or a passenger seat) on which an occupant sits in the front and rear directions of the vehicle M.

The backlight determination unit 170 determines whether an interior environment of the vehicle is a backlight state in which intense light equal to or greater than a predetermined amount is emitted from the rear side in the front and rear directions of the vehicle M. The backlight state may be, for example, a state in which light is emitted to the screen of the display device 20 allowing an occupant to display an image. The backlight state includes, for example, a case in which sunlight is emitted from the rear side of the vehicle M or a case in which a light of a vehicle behind is emitted. For example, on the basis of an analysis result by the image analysis unit 160, the backlight determination unit 170 determines that the interior environment is the backlight state when brightness of the face or body of an occupant facing the front side is equal to or less than a first predetermined value (a dark state) and the second illuminance is equal to or greater than a second predetermined value. The backlight determination unit 170 may determine that the interior environment of the vehicle is the backlight state when the second illuminance is simply equal to or greater than a third predetermined value.

The backlight determination unit 170 may determine that the interior environment of the vehicle is the backlight state when the brightness of the front side of the seat analyzed by the image analysis unit 160 is darker than the brightness of the rear side.

The luminance control unit 130B includes, for example, a luminance adjustment unit 132B and the correction unit 134. When the backlight determination unit 170 determines that the interior environment of the vehicle is the backlight state, the luminance adjustment unit 132B does not correct the second illuminance or the correspondence information 152 despite the detection of the abnormality of the first illuminance sensor 42 by the abnormality detection unit 120. Thus, it is possible to inhibit excessive adjustment of the luminance due to an influence of the backlight (adjustment so that it is difficult to view an image).

When the interior environment is the backlight state, the luminance adjustment unit 132B acquires the target luminance associated with the illuminance which matches with reference to the illuminance of the correspondence information 152 using the second illuminance without performing the correction, for example. The luminance adjustment unit 132B may maintain immediately previous luminance without performing the adjustment. In the third embodiment, correspondence information (third correspondence information) referred to when the backlight determination unit 170 determines that the interior environment is the backlight state may be stored in advance in the storage unit 150. In this case, when it is determined that the interior environment is the backlight state, the luminance adjustment unit 132B may acquire the target luminance using the third correspondence information.

[Process Flow]

Figure 10:
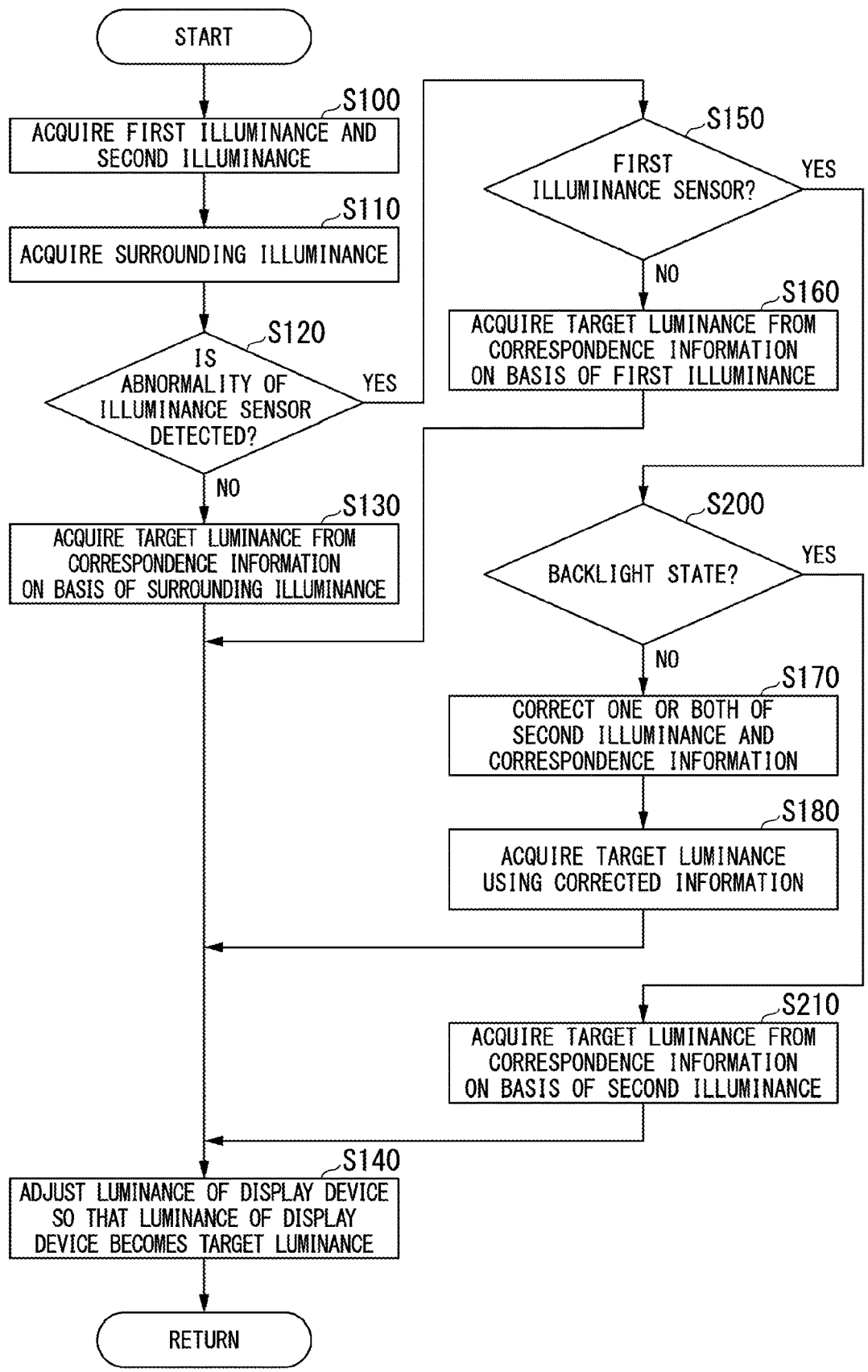
FIG. 10 is a flowchart illustrating an example of a flow of a process in the display control device according to the third embodiment.

FIG. 10 is a flowchart illustrating an example of a flow of a process in the display control device 100B according to the third embodiment. The process illustrated in FIG. 10 is different from the process of the flowchart illustrated in FIG. 6, as described above, in that processes of steps S200 and S210 are included. Accordingly, the processes of steps S200 and S210 will be mainly described below.

When a sensor of which an abnormality is detected is the first illuminance sensor in the process of step S150 of FIG. 10, the backlight determination unit 170 determines whether the interior environment of the vehicle M is the backlight state (step S200). When it is determined that the interior environment is the backlight state, the luminance adjustment unit 132B acquires the target luminance from the correspondence information 152 on the basis of the second illuminance (step S210) and subsequently performs the process of step S140. When it is determined that the interior environment is not the backlight state, the correction unit 134 performs the processes of steps S170 and S180. Subsequently, the luminance adjustment unit 132B performs the process of step S140.

As described above, the display control device 100B according to the third embodiment can inhibit excessive luminance adjustment by not correcting the second illuminance or the correspondence information 152 when the interior environment of the vehicle is the backlight state in addition to similar advantages to those of the first embodiment. Since a frequency of the backlight state is predicted to be higher than at the time of stop or the time of low-speed movement in accordance with a period of time, an orientation of the vehicle M, or a situation or the like of the vehicle M such as presence or absence of a vehicle behind in a moving body such as a vehicle moving at a relatively high speed, the more appropriate luminance adjustment can be performed by adjusting the luminance based on a determination result obtained by determining whether the interior environment is the backlight state.

Modification Examples

Each of the above-described first to third embodiments may be combined with some or all of other embodiments. In each of the above-described embodiments, the display control device 100 (also including the display control devices 100A and 100B) may set one or both of an upper limit and a lower limit in the luminance after the adjustment and perform adjustment so that one or both of the upper limit and the lower limit does not exceed a set value when the luminance is adjusted. In this way, the excessive luminance adjustment can be inhibited. In the above-described embodiments, the example in which the display control device 100 is mounted in the vehicle M has been described. In addition to this, the display control device 100 can also be applied to an auto interior dimming (AID) technology for various moving bodies such as flying objects or ships. The display control device 100 may be integrated with the display device 20. The display control device 100 may be mounted in a portable terminal or the like. The portable terminal is, for example, a terminal device which can be carried by a user, such as a smartphone, a tablet terminal, or a wearable terminal that has a display function. When the display control device 100 is mounted in a portable terminal, for example, the first illuminance sensor 42, the second illuminance sensor 44, the display device 20, and the display control device 100 are integrated with the portable terminal.

The embodiments for carrying out the present invention have been described above, but the present invention is not limited to the embodiments. Various modifications and substitutions can be made within the scope of the present invention without departing from the gist of the present invention.

What is claimed is:

1. A display control device comprising a processor configured to function as:
   an illuminance acquisition unit configured to acquire surrounding illuminance of a display unit on the basis of one or both of first illuminance detected by a first illuminance sensor and second illuminance detected by a second illuminance sensor;
a storage unit configured to store correspondence information in which illuminance is associated with target luminance;
a luminance control unit configured to control luminance of a screen of the display unit on the basis of the illuminance acquired by the illuminance acquisition unit and the correspondence information stored in the storage unit; and
an abnormality detection unit configured to detect an abnormal operation of at least the first illuminance sensor,
wherein the luminance control unit
acquires the target luminance associated with the surrounding illuminance of the display unit from the correspondence information on the basis of the surrounding illuminance of the display unit when the abnormality detection unit does not detect the abnormal operation of the first illuminance sensor,
acquires the target luminance on the basis of information in which one or both of the second illuminance and the correspondence information is corrected when the abnormality detection unit detects the abnormal operation of the first illuminance sensor, and
performs control such that the luminance of the screen of the display unit becomes the target luminance,
wherein the abnormality detection unit detects an abnormal operation of the second illuminance sensor, and
wherein the luminance control unit acquires the target luminance from the correspondence information based on the first illuminance when the abnormality detection unit detects the abnormal operation of the second illuminance sensor and does not detect the abnormal operation of the first illuminance sensor.

2. The display control device according to claim 1, wherein the display unit is mounted in a vehicle, and
wherein the second illuminance sensor detects illuminance by light on a rear side in front and rear directions of the vehicle.

3. The display control device according to claim 1, wherein the display unit is mounted in a vehicle, and
wherein the first illuminance sensor is installed at a position at which illuminance by light transmitted through a front windshield of the vehicle is detected more easily than the second illuminance sensor inside the vehicle.

4. The display control device according to claim 1, wherein the display unit is mounted in a vehicle, and
wherein the second illuminance sensor is installed near the display unit and is installed so that a detection region on a rear side of the vehicle in front and rear directions of the vehicle is broader than a detection region on a front side of the vehicle.

5. The display control device according to claim 1, wherein the luminance control unit acquires the target luminance from the correspondence information on the basis of a value obtained by correcting the second illuminance by a predetermined factor when the abnormality detection unit detects the abnormal operation of the first illuminance sensor.

6. The display control device according to claim 1, wherein the storage unit stores first correspondence information in which the surrounding illuminance of the display unit is associated with the target luminance and second correspondence information in which the second illuminance is associated with the target luminance, and
wherein the luminance control unit acquires the target luminance associated with the surrounding illuminance of the display unit from the first correspondence information on the basis of the surrounding illuminance of the display unit when the abnormality detection unit does not detect the abnormal operation of the first illuminance sensor, and
the luminance control unit acquires the target luminance associated with the second illuminance from the second correspondence information on the basis of the second illuminance when the abnormality detection unit detects the abnormal operation of the first illuminance sensor.

7. A display control device comprising a processor configured to function as:
an illuminance acquisition unit configured to acquire surrounding illuminance of a display unit on the basis of one or both of first illuminance detected by a first illuminance sensor and second illuminance detected by a second illuminance sensor;
a storage unit configured to store correspondence information in which illuminance is associated with target luminance;
a luminance control unit configured to control luminance of a screen of the display unit on the basis of the illuminance acquired by the illuminance acquisition unit and the correspondence information stored in the storage unit; and
an abnormality detection unit configured to detect an abnormal operation of at least the first illuminance sensor,
wherein the luminance control unit
acquires the target luminance associated with the surrounding illuminance of the display unit from the correspondence information on the basis of the surrounding illuminance of the display unit when the abnormality detection unit does not detect the abnormal operation of the first illuminance sensor,
acquires the target luminance on the basis of information in which one or both of the second illuminance and the correspondence information is corrected when the abnormality detection unit detects the abnormal operation of the first illuminance sensor, and
performs control such that the luminance of the screen of the display unit becomes the target luminance,
wherein the display unit is mounted in a vehicle,
wherein the display control device further comprises a backlight determination unit configured to determine whether an interior environment of the vehicle is a backlight state, and
wherein the luminance control unit does not correct the second illuminance or the correspondence information when the backlight determination unit detects the interior environment is the backlight state and the abnormality detection unit detects the abnormal operation of the first illuminance sensor.

8. A display control method causing a computer to perform:
acquiring surrounding illuminance of a display unit on the basis of one or both of first illuminance detected by a first illuminance sensor and second illuminance detected by a second illuminance sensor;

controlling luminance of a screen of the display unit on the basis of the acquired illuminance and correspondence information in which illuminance stored in a storage unit is associated with target luminance;

detecting an abnormal operation of at least the first illuminance sensor;

acquiring the target luminance associated with the surrounding illuminance of the display unit from the correspondence information on the basis of the surrounding illuminance of the display unit when the abnormal operation of the first illuminance sensor is not detected;

acquiring the target luminance on the basis of information in which one or both of the second illuminance and the correspondence information is corrected when the abnormal operation of the first illuminance sensor is detected; and performing control such that the luminance of the screen of the display unit becomes the target luminance;

detecting an abnormal operation of the second illuminance sensor, and acquiring the target luminance from the correspondence information based on the first illuminance in response to detecting the abnormal operation of the second illuminance sensor and does not detect the abnormal operation of the first illuminance sensor.

9. A computer-readable non-transitory storage medium that stores a program causing a computer to perform:

acquiring surrounding illuminance of a display unit on the basis of one or both of first illuminance detected by a first illuminance sensor and second illuminance detected by a second illuminance sensor;

controlling luminance of a screen of the display unit on the basis of the acquired illuminance and correspondence information in which illuminance stored in a storage unit is associated with target luminance;

detecting an abnormal operation of at least the first illuminance sensor;

acquiring the target luminance associated with the surrounding illuminance of the display unit from the correspondence information on the basis of the surrounding illuminance of the display unit when the abnormal operation of the first illuminance sensor is not detected;

acquiring the target luminance on the basis of information in which one or both of the second illuminance and the correspondence information is corrected when the abnormal operation of the first illuminance sensor is detected; and performing control such that the luminance of the screen of the display unit becomes the target luminance;

detecting an abnormal operation of the second illuminance sensor, and acquiring the target luminance from the correspondence information based on the first illuminance in response to detecting the abnormal operation of the second illuminance sensor and does not detect the abnormal operation of the first illuminance sensor.

* * * * *